(12) United States Patent
Kusama et al.

(10) Patent No.: US 10,170,740 B2
(45) Date of Patent: Jan. 1, 2019

(54) BATTERY AND BATTERY PACK WITH A BOLT AS AN ELECTRODE TERMINAL

(71) Applicant: TOYOTA JIDOSHA KABUSHIKI KAISHA, Toyota-shi, Aichi-ken (JP)

(72) Inventors: Kazuyuki Kusama, Nagoya (JP); Shigeru Matsumoto, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 187 days.

(21) Appl. No.: 15/010,581

(22) Filed: Jan. 29, 2016

(65) Prior Publication Data
US 2016/0226054 A1 Aug. 4, 2016

(30) Foreign Application Priority Data

Jan. 30, 2015 (JP) .................. 2015-016310

(51) Int. Cl.
*H01M 2/24* (2006.01)
*H01M 2/10* (2006.01)
*H01M 2/30* (2006.01)
*H01M 2/20* (2006.01)

(52) U.S. Cl.
CPC ......... *H01M 2/1072* (2013.01); *H01M 2/206* (2013.01); *H01M 2/305* (2013.01); *H01M 2220/20* (2013.01)

(58) Field of Classification Search
CPC .... H01M 2/1072; H01M 2/206; H01M 2/305; H01M 2220/20; H01M 2/30; H01M 2/06; H01M 2/202; H01M 2/1016

USPC ......................................................... 429/158
See application file for complete search history.

(56) References Cited

U.S. PATENT DOCUMENTS

| 2014/0227581 A1* | 8/2014 | Ohta | ................. H01M 2/06 |
| | | | 429/158 |
| 2015/0017501 A1 | 1/2015 | Harayama | |

FOREIGN PATENT DOCUMENTS

| JP | H09-213303 A | 8/1997 | |
| JP | 2011023141 A | 2/2011 | |
| JP | 2013-048047 A | 3/2013 | |
| JP | 2014-146498 A | 8/2014 | |
| JP | 3193133 U | 8/2014 | |
| JP | 3193133 * | 9/2014 | ............. H01M 2/10 |
| KR | 10-2014-0056325 A | 5/2014 | |
| WO | 2013/030880 A1 | 3/2013 | |

* cited by examiner

*Primary Examiner* — Gary D Harris
(74) *Attorney, Agent, or Firm* — Sughrue Mion, PLLC (57) ABSTRACT

A battery includes: an insulating plate; a connecting terminal plate; a terminal bolt that passes through the connecting terminal plate, the bolt head being between the insulating plate and the connecting terminal plate, and having a regular N-sided polygon shape, the N being an even number; and a nut. The insulating plate includes a first rotation stopping wall near an end of the insulating plate; the first rotation stopping wall includes a first a first abutting location that abuts the bolt head being rotated in a tightening direction of the nut, and a second abutting location that abuts the bolt head being rotated in a loosening direction of the nut; and a distance from the first abutting location to the first end is greater than a distance from the second abutting location to the first end.

7 Claims, 6 Drawing Sheets

BATTERY AND BATTERY PACK WITH A BOLT AS AN ELECTRODE TERMINAL

INCORPORATION BY REFERENCE

The disclosure of Japanese Patent Application No. 2015-016310 filed on Jan. 30, 2015 including the specification, drawings and abstract is incorporated herein by reference in its entirety.

BACKGROUND OF THE INVENTION

1. Field of the Invention

The invention relates to a battery and a battery pack. More particularly, the invention relates to a battery and a battery pack that uses a bolt as an electrode terminal.

2. Description of Related Art

Japanese Patent Application Publication No. 2013-048047 (JP 2013-048047 A), for example, describes a battery in which an electrode terminal of a positive electrode and an electrode terminal of a negative electrode are provided on a top plate (top panel or case cover) of a case. A battery pack in which high voltage is able to be output is able to be obtained by arranging a plurality of flat batteries parallel to one another, and electrically connecting these batteries in series.

If electrode terminals of both electrodes are provided on the top plate of the case, these electrode terminals need to be insulated from the top plate. The electrode terminals are electrically connected to a power generating element inside the case, and thus must be insulated from the top plate. Meanwhile, bolts are used for a portion of the electrode terminals described in JP 2013-048047 A in order to fix a bus bar or the like in place. The battery described in JP 2013-048047 A has the structure described below. Each of the electrode terminals of the battery described in JP 2013-048047 A is formed by a terminal bolt and a connecting terminal plate. An insulating plate is arranged on the top plate of the case, and the terminal bolt is arranged on this insulating plate, in such a manner that a top surface of a bolt head faces the insulating plate. On the other hand, the connecting terminal plate that is electrically connected to the power generating element inside the case and insulated from the top plate fits loosely over the terminal bolt, with the bolt head of the terminal bolt sandwiched between the connecting terminal plate and the insulating plate. A rotation stopping wall that restricts rotation of the terminal bolt is provided surrounding the bolt head, on the insulating plate (JP 2013-048047 A; FIG. 2). When fastening a nut onto the terminal bolt, a corner of the bolt head abuts against the rotation stopping wall, such that rotation of the bolt is restricted. Meanwhile, when a bus bar or the like is secured to the terminal bolt with the nut, the bus bar and the connecting terminal plate (i.e., the electrode terminal) are close contact, and the two are electrically connected.

SUMMARY OF THE INVENTION

The width of the battery in the short direction (i.e., the direction in which the width is the shortest, in a drawing that is defined by the shape when the battery is viewed from above) when the battery is viewed from above tends to become smaller. That is, the battery tends to become thinner. This is particularly noticeable in a stack type battery in which a plurality of batteries are arranged parallel to each other. Thus, the width, in the short direction of the top plate, of the insulating plate arranged on top of the top plate of the case also becomes smaller and approaches the diameter of the bolt head of the terminal bolt. For example, if the width of the top plate in the short direction is 10 millimeters, the length of the insulating plate in the short direction of the top plate will also be equal to or less than 10 millimeters. Meanwhile, the diameter of the bolt head is approximately 8 millimeters, for example. In this case, the wall thickness of the rotation stopping wall provided on both sides of the bolt head in the short direction of the top plate also has to be thinner. For example, when the shape of the bolt head is a regular tetragon, the wall thickness of the rotation stopping wall is approximately 2.2 millimeters ($\approx(10-8/\sqrt{2})/2$) by simple calculation. If a clearance of approximately 1 millimeter is provided between the rotation stopping wall and the bolt head, the wall thickness of the rotation stopping wall may also end up being approximately 1 millimeter. "Wall thickness" here refers to the shortest distance from a location where the bolt heat abuts against the rotation stopping wall, to an outer peripheral surface of a lateral wall of the insulating plate.

The insulating plate is made of resin or ceramics, and the rotation stopping wall is also made of resin or ceramics. If the rotation stopping wall is thin, it may crack or break at the location where the bolt head abuts against it due to tightening torque when screwing down the bus bar with the nut. The invention thus provides technology that inhibits a rotation stopping plate provided on an insulating plate from cracking or breaking, in a battery in which a length in a short direction of a case top plate (i.e., a direction perpendicular to a longitudinal direction of the case top plate) is short.

A first aspect of the invention relates to a battery including: a flat case that has a top plate being an elongated rectangular shape; a power generating element that is housed in the case; an insulating plate arranged above the top plate; a connecting terminal plate that is electrically connected to the power generating element and insulated from the top plate; a terminal bolt that has a bolt head, passes through the connecting terminal plate and is arranged above the insulating plate such that a top surface of the bolt head faces the insulating plate, the bolt head being placed between the insulating plate and the connecting terminal plate, and having a regular N-sided polygon shape, the N being an even number; and a nut that screws onto the terminal bolt. The insulating plate includes a rotation stopping wall that is configured to restrict rotation of the bolt head; the rotation stopping wall includes a first rotation stopping wall and a second rotation stopping wall, the first rotation stopping wall that is closest to a first end of the insulating plate in a short direction of the rotation stopping wall, the short direction being parallel to short sides of the elongated rectangular shape of the top plate; the first rotation stopping wall includes a first abutting location and a second abutting location, the first abutting location abuts the bolt head when the bolt head is rotated in a tightening direction of the nut, and the second abutting location abuts the bolt head when the bolt head is rotated in a loosening direction of the nut; and a distance from the first abutting location to the first end is greater than a distance from the second abutting location to the first end.

In the first aspect, the rotation stopping wall may include a second rotation stopping wall; the bolt head may be placed between the first rotation stopping wall and the second rotation stopping wall; the second rotation stopping wall may be closest to a second end in the short direction of the insulation plate; the second rotation stopping wall may include a third abutting location and a fourth abutting location, the third abutting location may abut the bolt head when the bolt head is rotated in the tightening direction of the nut that screws onto the terminal bolt, and the fourth abutting location may abut the bolt head when the bolt head is rotated in the loosening direction of the nut; and a distance from the third abutting location to the second end may be greater than a distance from the fourth abutting location to the second end.

In the first aspect, the bolt head may be surrounded by an enclosure wall that includes the rotation stopping wall. An inner peripheral shape of the enclosure wall when viewed from an axial direction of the terminal bolt may be a regular N-sided polygon. One side of the regular N-sided polygon of the inner peripheral shape may be inclined at an angle of greater than zero degrees and less than 180/N degrees in a direction that loosens the nut, with respect to a longitudinal direction of the top plate.

In the first aspect, a wall thickness at the first abutting location may be set such that one side of the bolt head is parallel to a longitudinal direction of the top plate when the bolt head is rotated in the tightening direction of the nut and the bolt head is abutted against the rotation stopping wall.

In the first aspect, the first abutting location may be a protruding portion provided on the first rotation stopping wall.

In the first aspect, the first rotation stopping wall may include a first wall surface that has a first abutting portion, and a second wall surface that has a second abutting portion.

A second aspect of the invention provides a battery pack in which a plurality of the batteries according to the first aspect are arranged parallel to each other, wherein the terminal bolts of the batteries that are adjacent to one another are connected by a bus bar; and the bus bar is fastened to the bolts by the nuts.

That is, with the battery of the aspect described above, the wall thickness at the location (the second abutting location) where rotation of the bolt head is stopped when the bolt head is rotated in the direction that loosens the nut is made thinner, and the wall thickness at the location (the first abutting location) where rotation of the bolt head when the bolt head is rotated in the direction that tightens the nut is made thicker by that amount. The nut is loosened when replacing the internal power generating element, so damage to the rotation stopping wall may be permissible, because the insulating plate need simply be replaced. With the battery according to the aspect of the invention, the wall thickness at a location where rotation of the bolt head is stopped when the nut is tightened is made thicker, thereby increasing the strength, while allowing a reduction in the strength at a location where rotation of the bolt head is stopped when loosening the nut.

With the aspect described above, the wall thickness at the first abutting location is able to be made thicker than the wall thickness when the inner wall surface (the wall surface facing the bolt head) of the rotation stopping wall extends parallel to the longitudinal direction of the top plate. Therefore, the rotation stopping wall that restricts rotation of the terminal bolt when tightening the nut will not crack or break easily. The details and further improvements of the technology described in this specification will be described in example embodiments of the invention.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
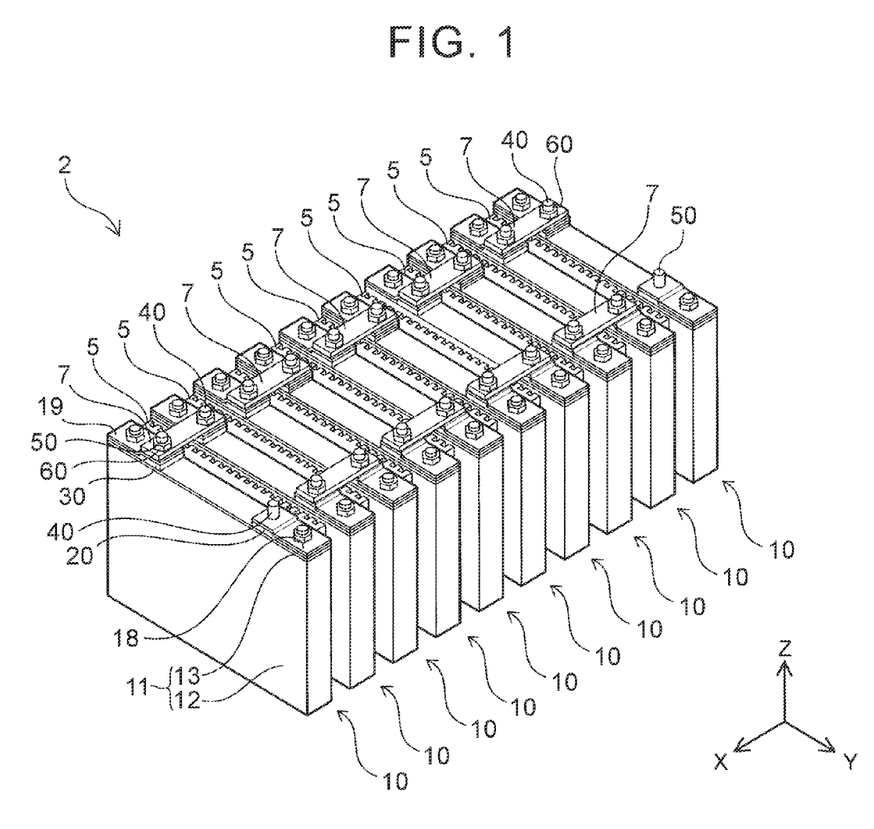
FIG. 1 is a perspective view of a battery pack according to an example embodiment of the invention.

A battery and a battery pack according to an example embodiment of the invention will now be described with reference to the drawings. First, the structure of a battery pack 2 of the example embodiment will be described with reference to FIG. 1. FIG. 1 is a perspective view of the battery pack 2 according to the example embodiment. The battery pack 2 is formed by a plurality of sealed batteries 10 arranged parallel to one another. Each of the sealed batteries 10 is a non-aqueous electrolyte secondary battery in which an electrode body (a power generating element) is housed inside of a case 11, described later, formed in a flat rectangular shape. More specifically, the sealed batteries 10 are rectangular sealed lithium-ion secondary batteries, for example. Hereinafter to simplify the description, the sealed batteries 10 will simply be referred to as "batteries 10". Also, to simplify the description and facilitate understanding, the batteries 10 and other portions provided in plurality may also be referred to in the singular when appropriate.

The battery pack 2 is able to output power of a high voltage by having the sealed batteries 10 electrically connected together in series. In this example embodiment, sealed batteries 10 that are adjacent are arranged parallel to each other with a spacer 5 in between, and a positive electrode terminal bolt 40 of one of battery 10, from among two adjacent batteries 10, is connected by a bus bar 7 to a negative electrode terminal bolt 50 of the other battery 10, of the two adjacent batteries 10. The bus bar 7 is fixed sandwiched between the positive electrode terminal bolt 40 (or the negative electrode terminal bolt 50) and a nut 60. The plurality of sealed batteries 10 are electrically connected in series by the bus bar 7.

The battery pack 2 is mounted in a vehicle powered partly or entirely by electricity, such as a hybrid vehicle or an electric vehicle, and hereinafter simply referred to as "electric vehicle", for example, and supplies power as a power source. When the battery pack 2 is mounted in an electric vehicle, a predetermined restraint load is applied in the arrangement direction (i.e., the X axis direction in the coordinate system shown in FIG. 1) of the batteries 10 in order to protect the electrode body inside the case 11 from vibration input from the road surface or the like while running. Although not shown, the predetermined restraint load is applied to these batteries 10 by a pair of pressure plates that sandwich the plurality of batteries 10 from both sides in the arrangement direction, for example. A plurality of grooves extending in a height direction of the batteries 10 (i.e., the Z axis direction in the coordinate system shown in FIG. 1) are formed in the spacer 5. The batteries 10 are cooled by flowing a cooling medium such as air through these grooves. Reference characters 18 and 19 in FIG. 1 denote connecting plates that are connected to the electrode body housed inside the case 11. Also, reference characters 20 and 30 denote insulating plates. Reference character 12 denotes a case main body, and reference character 13 denotes a case cover. The case 11 is formed by the case main body 12 and the case cover 13.

Figure 2:
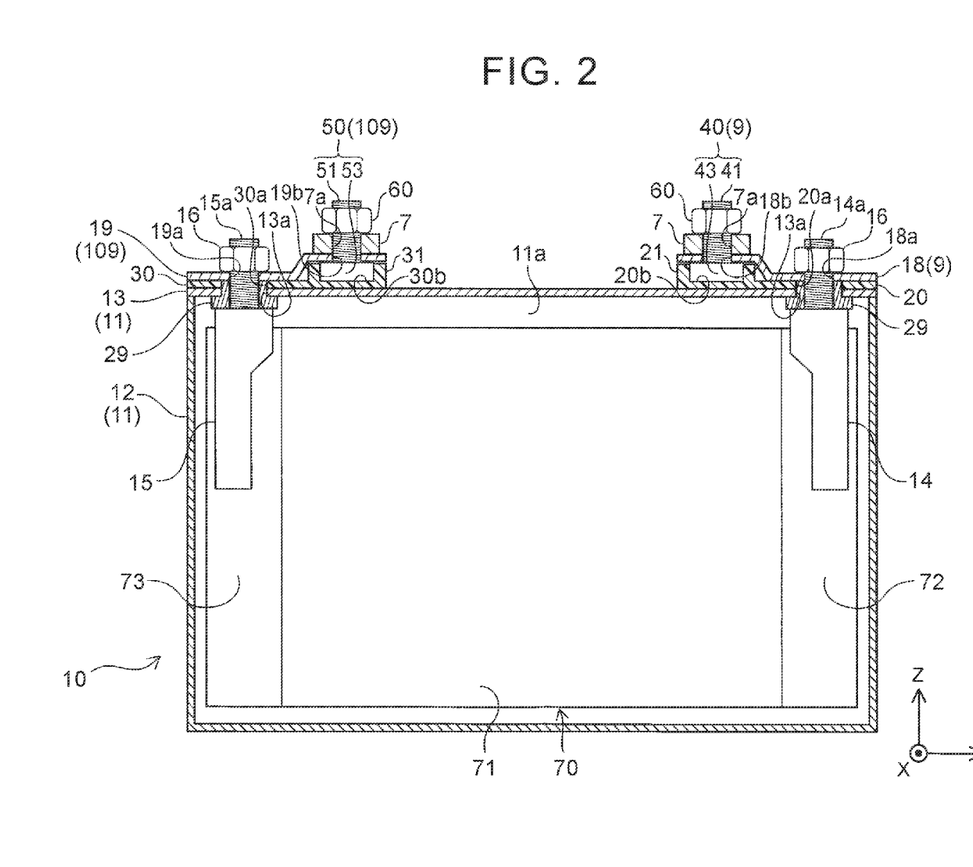
FIG. 2 is a sectional view of the battery of the example embodiment cut along a YZ plane.
Figure 3:
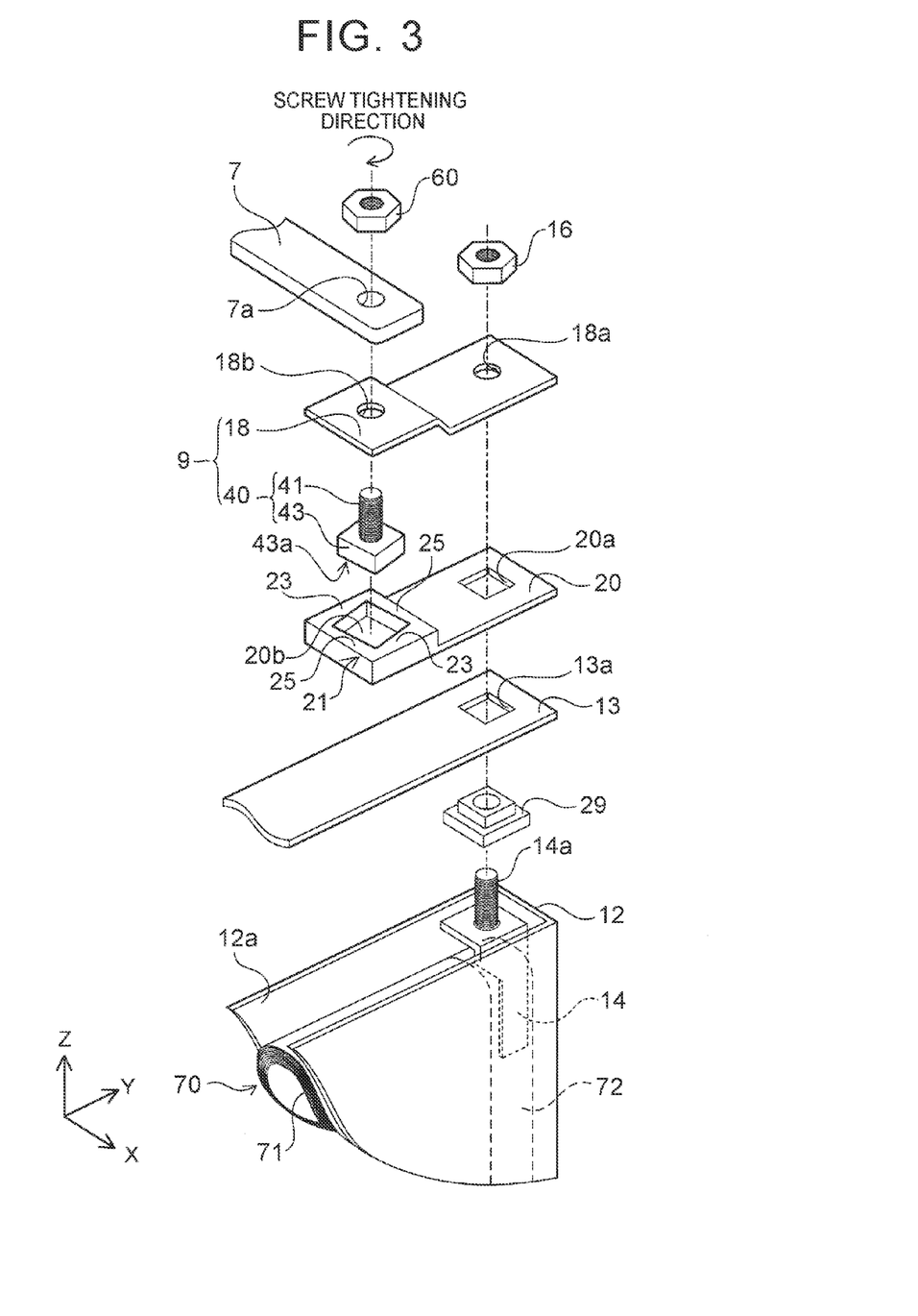
FIG. 3 is an exploded sectional view of the peripheral portion of a positive electrode collector terminal and a positive electrode terminal bolt of the battery of the example embodiment.

Next, the structure of the battery 10 will be described with reference to FIGS. 2 to 4. FIG. 2 is a sectional view of the battery 10 cut along the YZ plane. FIG. 3 is an exploded perspective view of part around a positive electrode of the battery 10. FIG. 4A to FIG. 4C is a plan view illustrating the position relationship between an inner peripheral shape of an enclosure wall 21, described later, of the insulating plate 20, and a bolt head 43 of the positive electrode terminal bolt 40. The battery 10 mainly includes the case 11, the connecting plates 18 and 19, the insulating plates 20 and 30, the positive electrode terminal bolt 40, the negative electrode terminal bolt 50, and an electrode body 70 and the like. The connecting plate 18 and the positive electrode terminal bolt 40 form an electrode terminal 9 of the positive electrode, and the connecting plate 19 and the negative electrode terminal bolt 50 form an electrode terminal 109 of the negative electrode.

The case 11 is formed by the case main body 12 and the case cover 13. The case main body 12 is a flat metal thin box in which a length in a short direction (the X axis direction in the coordinate system in the drawing) is significantly shorter than the length in a longitudinal direction (the Y axis direction in the coordinate system in the drawing) and the height direction (the Z axis direction in the coordinate system shown in the drawings). The case main body 12 is a thin box with a bottom, and a top portion is open in an elongated rectangular shape (opening 12a, see FIG. 3). The case cover 13 is a thin metal plate that seals the opening 12a of the case main body 12 in a liquid-tight manner, and is formed in a long narrow strip shape in this example embodiment. The case cover 13 corresponds to the top plate of the case 11.

A pair of through-holes 13a are provided on near each end of the case cover 13. A bolt portion 14a of a positive electrode collector terminal 14 is inserted through one of these through-holes 13a. A bolt portion 15a of a negative electrode collector terminal 15 is inserted through the other through-hole 13a. An insulating gasket 29 is inserted into each of these through-holes 13a, and then the bolt portions 14a and 15a are inserted through these insulating gaskets 29. The insulating gasket 29 ensures insulation between the bolt portions 14a and 15a and the case cover 13, as well as seals between the through-holes 13a and the bolt portions 14a and 15a in a liquid-tight manner. As will be described later, the bolt portion 14a is electrically connected to the electrode terminal 9 (i.e., the connecting plate 18 and the positive electrode collector terminal 14) of the positive electrode. The bolt portion 15a is electrically connected to the electrode terminal 109 (i.e., the connecting plate 19 and the negative electrode terminal bolt 50) of the negative electrode.

The electrode body 70 (the power generating element) that is rolled in a flat shape is housed inside the case main body 12, and electrolyte in which the housed electrode body 70 is immersed is filled into the case main body 12. As shown in FIG. 3, the electrode body 70 is a rolled electrode body in which a positive electrode sheet having a positive electrode active material layer and a negative electrode sheet having a negative electrode active material layer are rolled, with a separator therebetween, in a flat shape. Although these are not shown individually, a portion of the positive electrode sheet and the like that is stacked as a result of being rolled is shown. These sheets are rolled offset from each other by a predetermined distance in the direction of the rolling axis. The portion where only the positive electrode sheet is rolled functions as a positive-electrode electrode portion 72, and the portion where only the negative electrode sheet is rolled functions as a negative-electrode electrode portion 73. Furthermore, the area where the positive electrode sheet and the negative electrode sheet overlap with the separator sandwiched in between functions as a power generating portion 71.

The positive electrode collector terminal 14 is connected to the positive-electrode electrode portion 72. Also, the negative electrode collector terminal 15 is connected to the negative-electrode electrode portion 73. As described above earlier, the positive electrode collector terminal 14 is electrically connected to the electrode terminal 9 (i.e., the connecting plate 18 and the positive electrode terminal bolt 40) of the positive electrode outside the case 11. The negative electrode collector terminal 15 is electrically connected to the electrode terminal 109 (i.e., the connecting plate 19 and the negative electrode terminal bolt 50) of the negative electrode outside the case 11. When the electrode body 70 that is immersed in the electrolyte generates power, this power is output to the electrode terminal 9 of the positive electrode and the electrode terminal 109 of the negative electrode via the positive electrode collector terminal 14 and the negative electrode collector terminal 15. Also, the electrode body 70 is charged by power supplied from an external device being input from the electrode terminal 9 of the positive electrode and the electrode terminal 109 of the negative electrode. Only a portion of the power generating portion 71 and the positive-electrode electrode portion 72 of the electrode body 70 is shown in FIG. 3. The remaining portion of the power generating portion 71 and the positive-electrode electrode portion 72 is omitted. Also, in FIG. 3, the negative electrode collector terminal 15, the insulating plate 30, and the connecting plate 19 and the like are also omitted. Moreover, in addition to the positive electrode terminal bolt 40 and the negative electrode terminal bolt 50, a filler port for filling electrolyte into an internal space 11a of the case 11, and a safety valve that prevents the internal pressure of the case 11 from rising, and the like are provided in the case cover 13, but these are not shown.

The bolt portion 14a is provided on an upper portion of the positive electrode collector terminal 14. As described above, the through-hole 13a is provided in the case cover 13, and the bolt portion 14a passes through this through-hole 13a and extends toward the outside of the case 11. The insulating gasket 29 is inserted between the bolt portion 14a and the through-hole 13a (i.e., the case cover 13). The insulating gasket 29 insulates between the positive electrode collector terminal 14 and the case cover 13, and seals the through-hole 13a of the case cover 13 in a liquid tight manner. The negative electrode collector terminal 15 is the same, with the bolt portion 15a provided on an upper portion thereof. As described above, the other through-hole 13a is provided in the case cover 13, and the bolt portion 15a passes through this through-hole 13a and extends toward the outside of the case 11. The insulating gasket 29 is also inserted between the bolt portion 15a and this other through-hole 13a (i.e., the case cover 13). The insulating gasket 29 insulates between the negative electrode collector terminal 15 and the case cover 13, and seals this other through-hole 13a of the case cover 13 in a liquid tight manner.

The connecting plates 18 and 19 are formed by strip-shaped metal plates that have been bent so as to overlap with the insulating plates 20 and 30 that will be described next. In this example embodiment, the connecting plate 18, together with the positive electrode terminal bolt 40, forms the electrode terminal 9 that electrically connects the electrode body 70 (i.e., the positive-electrode electrode portion 72) to an external device. Simultaneously, the connecting plate 18 also serves to inhibit the positive electrode terminal bolt 40 from coming off of the case cover 13. Similarly, the connecting plate 19, together with the negative electrode terminal bolt 50, forms the electrode terminal 109 that electrically connects the electrode body 70 (i.e., the negative-electrode electrode portion 73) to an external device. Simultaneously, the connecting plate 19 also serves to inhibit the negative electrode terminal bolt 50 from coming off of the case cover 13.

A through-hole 18a through which the bolt portion 14a of the positive electrode collector terminal 14 is inserted, and a through-hole 18b through which a bolt main body 41 of the positive electrode terminal bolt 40 is loosely inserted, are both formed in the connecting plate 18. A through-hole 19a through which the bolt portion 15a of the negative electrode collector terminal 15 is inserted, and a through-hole 19b through which a bolt main body 51 of the negative electrode terminal bolt 50 is loosely inserted, are both formed in the connecting plate 19. The connecting plate 18 is secured, together with the insulating plate 20 and the case cover 13, to the bolt portion 14a of the positive electrode collector terminal 14 by a nut 16. In this way, the connecting plate 18 is fixed to the case cover 13. As described earlier, the insulating gasket 29 is fit into the through-hole 13a of the case cover 13, such that the bolt portion 14a of the positive electrode collector terminal 14 is insulated from the case cover 13. Also, the insulating plate 20 is sandwiched between the case cover 13 and the electrode terminal 9 (i.e., the connecting plate 18 and the positive electrode terminal bolt 40). The insulating plate 20 ensures insulation between these.

The negative electrode side is similar to the positive electrode side. That is, the connecting plate 19 is secured, together with the insulating plate 30 and the case cover 13, to the bolt portion 15a of the negative electrode collector terminal 15 by a nut 16. In this way, the connecting plate 19 is fixed to the case cover 13. The bolt portion 15a is insulated from the case cover 13 by the insulating gasket 29, and the electrode terminal 109 of the negative electrode (i.e., the negative electrode terminal bolt 50 and the connecting plate 19) is insulated from the case cover 13 by the insulating plate 30.

The insulating plates 20 and 30 are plate-like members made of highly insulating resin material. In this example embodiment, the insulating plates 20 and 30 are both formed in a strip shape in which the length in the longitudinal direction (the Y axis direction) is set shorter than the case cover 13, and the length in the short direction (the X axis direction) is set to be substantially the same size as the case cover 13. Hereinafter, in order to simplify the description, the "short direction (the X axis direction) of the case cover 13" will simply be referred to as the "short direction", and the "longitudinal direction (the Y axis direction) of the case cover 13" will simply be referred to as the "longitudinal direction".

The positive electrode side and the negative electrode side of the battery 10 have similar structures. Therefore, FIG. 3 is an exploded view of parts around the positive electrode side. The structure of the parts on the positive electrode side will now be described in more detail. A through-hole 20a is formed on one end side of the insulating plate 20. This through-hole 20a is a hole through which the insulating gasket 29 and the bolt portion 14a of the positive electrode collector terminal 14 are inserted. A flat portion 20b is provided on the other end side of the insulating plate 20. The positive electrode terminal bolt 40 is arranged above this flat portion 20b, in a manner such that a top surface 43a of the bolt head 43 faces the flat portion 20b. After the positive electrode terminal bolt 40 is arranged above the flat portion 20b, the connecting plate 18 is fit over the positive electrode terminal bolt 40. A through-hole 18a is provided in one end of the connecting plate 18, and the connecting plate 18 is fixed to the bolt portion 14a of the positive electrode collector terminal 14 by the nut 16. The connecting plate 18 is insulated from the case cover 13 by the insulating plate 20 sandwiched therebetween. The connecting plate 18 is fixed to the case cover 13 by the bolt portion 14a and the nut 16. The bolt main body 41 loosely fits through the through-hole 18b, and the bolt head 43 is sandwiched between the connecting plate 18 and the insulating plate 20. The connecting plate 18 retains the bolt head 43 such that the positive electrode terminal bolt 40 does not come away from the case cover 13. However, the connecting plate 18 does allow the bolt head 43 to rotate freely and jiggle slightly. The work of attaching the bus bar 7 is able to be performed more easily by jiggling the positive electrode terminal bolt 40 slightly with respect to the case cover 13.

The structure from the electrode body 70 (the positive-electrode electrode portion 72) to the positive electrode terminal bolt 40 is summarized below. The case 11 is flat, and has the long narrow case cover 13 (top plate) on a top portion. The electrode body 70 is housed in the case 11. The through-hole 13a is provided in the case cover 13. The insulating plate 20 is arranged above the case cover 13. The positive electrode terminal bolt 40 is arranged on above the insulating plate 20, in a manner such that the top surface 43a of the bolt head 43 faces the insulating plate 20. Meanwhile, one end of the positive electrode collector terminal 14 is electrically connected to the electrode body 70 (the positive-electrode electrode portion 72), and the other end of the positive electrode collector terminal 14 passes through the case cover 13 and the insulating plate 20 while being insulated from the case cover 13. The connecting plate 18 is arranged above the insulating plate 20. One end of the connecting plate 18 is electrically and structurally connected to the positive electrode collector terminal 14. The other end of the connecting plate 18 loosely fits over the positive electrode terminal bolt 40, and the bolt head 43 is sandwiched between the positive electrode terminal bolt 40 and the insulating plate 20. The structure of the negative electrode side is similar to the structure of the positive electrode side.

Returning now to FIG. 3, the insulating plate 20 will continue to be described. The enclosure wall 21 is formed on the insulating plate 20 so as to surround the bolt head 43. The connecting plate 18 allows the bolt head 43 to rotate freely, but the enclosure wall 21 restricts the rotation of the bolt head 43. When viewed from above (the Z axis direction), the inner peripheral shape of the enclosure wall 21 is a shape similar to the outer peripheral shape of the bolt head 43. The outer peripheral shape of the bolt head 43 is a shape that is defined by the outer contour (visible outline) of the bolt head 43 that is visible when the bolt head 43 is viewed from the axial direction of the bolt main body 41. The inner peripheral shape of the enclosure wall 21 is a shape that is defined by an inner wall surface of the enclosure wall 21 that faces the bolt head 43 when the insulating plate 20 is viewed from above (the Z axis direction). The Z axis direction matches the direction of the axis of the positive electrode terminal bolt 40 positioned on the insulating plate 20.

A predetermined gap (clearance) is provided between the inner wall surface of the enclosure wall 21 and an outer peripheral surface of the bolt head 43. The bolt head 43 is able to rotate within a predetermined angle inside the enclosure wall 21, but is unable to rotate freely. When rotated the predetermined angle, the bolt head 43 abuts against the inner wall surface of the enclosure wall 21, and rotation is restricted. The inner peripheral shape of the enclosure wall 21 will be described in detail later.

The enclosure wall 21 is formed by a pair of lateral walls 23 positioned one on each side of the bolt head 43 in the short direction (i.e., the short direction of the case cover 13), and a pair of longitudinal walls 25 positioned one on each side of the bolt head 43 in the longitudinal direction (i.e., the longitudinal direction of the case cover 13). The pair of lateral walls 23 extend in a direction inclined a predetermined angle with respect to the longitudinal direction. The pair of longitudinal walls 25 extend in a direction inclined a predetermined angle with respect to the short direction. The pair of lateral walls 23 and the pair of longitudinal walls 25 both serve to stop rotation. Hereinafter, the lateral walls 23 and longitudinal walls 25 and other portions provided in plurality may be referred to in the singular to simplify the description and facilitate understanding.

For example, after the bolt main body 41 is inserted through a through-hole 7a of the bus bar 7, the nut 60 is screwed onto the bolt main body 41, such that the bus bar 7 is screwed and fixed to the positive electrode terminal bolt 40. At this time, the bolt head 43 attempts to rotate with the nut 60 in the screw tightening direction. At this time, the enclosure wall 21 (i.e., the lateral walls 23 and the longitudinal walls 25) prevents the bolt head 43 from rotating in the screw tightening direction. That is, the enclosure wall 21 (i.e., the lateral walls 23 and the longitudinal walls 25) restrict free rotation of the positive electrode terminal bolt 40. In this example embodiment, the outer peripheral shape of the bolt head 43 is a regular tetragon (a square). Therefore, the inner peripheral shape of the enclosure wall 21 is formed in a square shape that is larger than the regular tetragon of the bolt head 43.

The negative electrode terminal bolt 50 is formed by the bolt main body 51 and a bolt head 53, and is positioned on a flat portion 30b of the insulating plate 30. An enclosure wall 31 is provided on the insulating plate 30 so as to surround the bolt head 53. The relationship between the negative electrode terminal bolt 50 and the enclosure wall 31 of the insulating plate 30 is the same as the relationship between the positive electrode terminal bolt 40 and the enclosure wall 21 of the insulating plate 20. Hereinafter, mainly the insulating plate 20 on the positive electrode side will be described, but the same description may also be applied to the insulating plate 30 on the negative electrode side.

Before describing the inner peripheral shape of the enclosure wall 21, the advantages of the structure in which the electrode terminal 9 is formed by the positive electrode terminal bolt 40 and the connecting plate 18, and the positive electrode terminal bolt 40 is stopped from rotating by the enclosure wall 21 of the insulating plate 20, will be described.

When the electrode terminals 9 and 109 of both electrodes are provided on the case cover 13, it is necessary to insulate the electrode terminals 9 and 109 from the case cover 13. From here, the electrode terminal 9 of the positive electrode will be described. The electrode terminal 9 is electrically connected to the electrode body 70, and must be insulated from the case cover 13. Meanwhile, the electrode terminal 9 has a thread (the bolt main body 41) for fixing the bus bar 7 sandwiched between it (i.e., the electrode terminal 9) and the nut 60. Tightening torque is applied to the electrode terminal 9 when fixing the bus bar 7. Also, when fixing the bus bar 7, force that tilts the electrode terminal 9 is also applied to the electrode terminal 9. The structure is preferably such that when tightening the nut 60, force is applied to the electrode terminal 9, but this force is not transmitted directly to the electrode body 70 inside the electrode body 70. That is, the electrode terminal 9 must meet the foregoing electrical and structural conditions.

With the battery 10 of this example embodiment, the electrode terminal 9 is insulated from the case cover 13 by the insulating plate 20 and the insulating gasket 29, so the foregoing electrical condition is met. On the other hand, the electrode terminal 9 is formed by the positive electrode terminal bolt 40 and the connecting plate 18. The positive electrode terminal bolt 40 fits loosely through the connecting plate 18, so both slide. Rotation of the positive electrode terminal bolt 40 is restricted by the insulating plate 20. Therefore, when tightening the nut 60, the force applied to the positive electrode terminal bolt 40 is not directly applied to the electrode body 70, so the foregoing structural condition is also met.

Next, the inner peripheral shape of the enclosure wall 21 that restricts the rotation of the bolt head 43 will be described with reference to FIG. 4A to FIG. 4C. The enclosure wall 31 on the negative electrode side is the same, so a description of the enclosure wall 31 will be omitted.

In this example embodiment, the regular tetragon formed by the inner peripheral shape of the enclosure wall 21 is determined such that sides corresponding to inner wall surfaces 23a of the lateral walls 23 are at an angle θ with respect to the longitudinal direction of the case cover 13. Outer wall surfaces 23b of the lateral walls 23 match the edges of the case cover 13 in the long direction when viewed from above. Put another way, the angle θ around the Z axis of the inner peripheral shape with respect to the longitudinal direction may be construed as the posture of the inner peripheral shape of the enclosure wall 21. FIGS. 4A to 4C are plan views of the insulating plate 20 from above (i.e., from the Z axis direction). FIGS. 4A to 4C illustrate three cases in which the angle θ of the inner peripheral shape is different.

The inner peripheral shape that is defined by the inner wall surface of the enclosure wall 21 is formed by the pair of inner wall surfaces 23a of the lateral walls 23 and the pair of inner wall surfaces 25a of the longitudinal walls 25. As shown in FIG. 4A, the regular tetragon defined by the inner peripheral shape created by the enclosure wall 21 does not have sides that are parallel with the longitudinal direction. The regular tetragon defined by the inner peripheral shape of the enclosure wall 21 has sides that extend in directions that are rotated an angle θ in a loosening direction of the nut 60 that screws onto the positive electrode terminal bolt 40, with respect to the longitudinal direction. The loosening direction of the nut 60 corresponds to the opposite direction from the tightening direction of the nut 60 (i.e., the clockwise direction in the plan view of FIG. 4A to FIG. 4C).

Also, as the condition for stopping rotation, the inner peripheral shape of the enclosure wall 21 is set such that the diameter of a circle (an inscribed circle) inscribed in the inner peripheral shape is smaller than the diameter of a circle (a circumscribed circle) circumscribing the outer peripheral shape of the bolt head 43 of the positive electrode terminal bolt 40.

By forming the enclosure wall 21 in this way, the bolt head 43 of the positive electrode terminal bolt 40 is allowed to rotate a predetermined angle inside the enclosure wall 21. For example, in FIG. 4A, the bolt head 43 indicated by the solid line is an example in which the bolt head 43 is rotated in the tightening direction of the nut 60 inside the enclosure wall 21, and this rotation is prevented by the lateral walls 23. In contrast, the bolt head 43 indicated by the broken line is an example in which the bolt head 43 is rotated in the loosening direction of the nut 60, and this rotation is prevented by the lateral walls 23. That is, in both examples, the bolt head 43 abuts against the lateral walls 23 and is stopped from rotating. When comparing these examples, a wall thickness Ts of the lateral wall 23 at a location (a first abutting location Ps) where the bolt head 43 that has been rotated in the tightening direction abuts against the lateral wall 23 is greater (i.e., thicker) than a wall thickness Tr of the lateral wall 23 at a location (a second abutting location Pr) where the bolt head 43 that has been rotated in the loosening direction abuts against the lateral wall 23.

The average wall thickness of the wall thickness Ts and the wall thickness Tr is equivalent to the wall thickness when one side of the inner peripheral shape (i.e., the inner wall surface 23a of the lateral wall 23) is parallel to the longitudinal direction. Therefore, it is evident that the mode of FIG. 4A is equivalent to reducing the wall thickness Tr of the location (the second abutting location Pr) where the bolt head 43 that has been rotated in the loosening direction abuts against the lateral wall 23, and increasing the wall thickness Ts at the location (the first abutting location Ps) where the bolt head 43 that has been rotated in the tightening direction abuts against the lateral wall 23. With the mode of FIG. 4A, the strength of the lateral wall 23 at the location (the first abutting location Ps) where the bolt head 43 that has been rotated in the tightening direction abuts against the lateral wall 23 is increased compared to a case in which one side (i.e., the inner wall surface 23a of the lateral wall 23) of the inner peripheral shape is parallel to the longitudinal direction. Therefore, even if the bolt head 43 that has been rotated in the tightening direction abuts against the lateral wall 23 at the first abutting location Ps, the lateral wall 23 will not easily crack or break.

The nut 60 is loosened when replacing the electrode body 70 housed in the internal space 11a of the case 11, so if the lateral wall 23 of the insulating plate 20 is damaged, for example, the insulating plate 20 need simply be replaced.

In this way, the battery 10 of the example embodiment is configured such that the wall thickness of the abutting location (the second abutting location) of the lateral wall 23 that stops the rotation of the bolt head 43 when loosening the nut 60 that is screwed onto the positive electrode terminal bolt 40 is thin, but the wall thickness of the abutting location (the first abutting location) of the lateral wall 23 that stops the rotation of the bolt head 43 when tightening the nut 60 is thick. When the inner peripheral shape of the enclosure wall 21 of the insulating plate 20 is a regular tetragon, the range of the angle θ where the thickness in the first abutting location is able to be thicker is 0 (zero) degrees <θ<45 degrees (=180 degrees/4). FIG. 4B is a view showing a case with a minimum angle θa that slightly exceeds 0 (zero) degrees. In this case, the wall thickness Tsa at the first abutting location Ps where the bolt head 43 (the solid square) abuts when the bolt head 43 is rotated in the direction that tightens the nut 60 is slightly greater (thicker) than a wall thickness Tra at the second abutting location Pr where the bolt head 43 (the broken square) abuts when the bolt head 43 is rotated in the direction that loosens the nut 60.

Figure 4A:
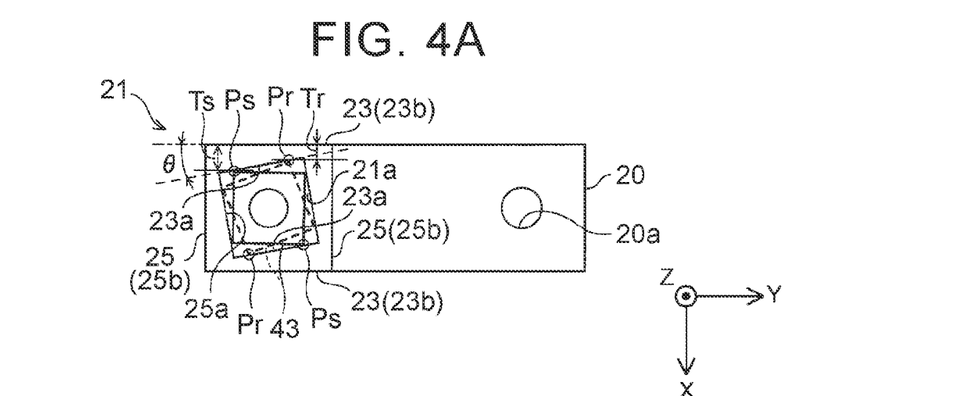
FIG. 4A is a plan view illustrating the positional relationship between an inner peripheral shape of an enclosure wall of an insulating plate and an outer peripheral shape of the bolt head, with the posture (angle θ) of the inner peripheral shape.
Figure 4B:
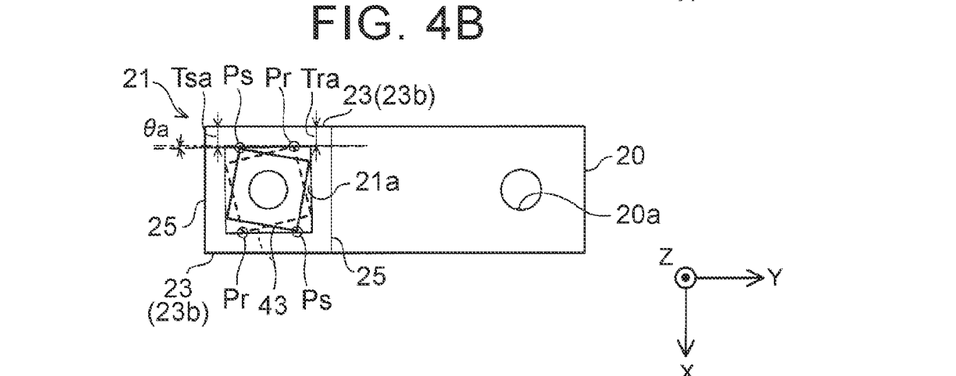
FIG. 4B is a plan view illustrating the positional relationship between an inner peripheral shape of an enclosure wall of an insulating plate and an outer peripheral shape of the bolt head, with the posture (angle θa) of the inner peripheral shape being different from the posture angle of the inner peripheral shape in FIG. 4A.
Figure 4C:
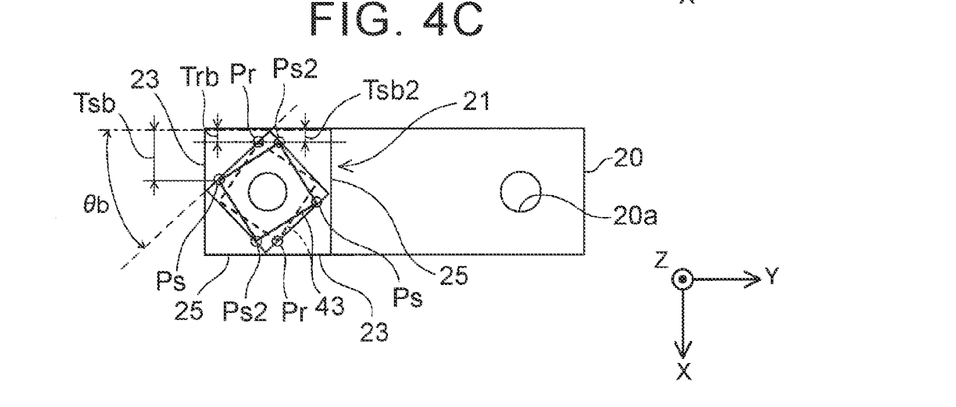
FIG. 4C is a plan view illustrating the positional relationship between an inner peripheral shape of an enclosure wall of an insulating plate and an outer peripheral shape of the bolt head, with the posture (angle θb) of the inner peripheral shape being different from the posture angles of the inner peripheral shape in FIG. 4A and FIG. 4B.

Also, FIG. 4C is a view showing the inner peripheral shape at a maximum angle θb that is slightly under 45 degrees. In the case of FIG. 4C, a wall thickness Tsb of the first abutting location Ps where the bolt head 43 (the solid square) abuts when the bolt head 43 is rotated in the direction that tightens the nut 60 is significantly larger (thicker) than a wall thickness Trb of the second abutting location Pr where the bolt head 43 (the broken square) abuts when the bolt head 43 is rotated in the direction that loosens the nut 60. However, in the case of FIG. 4C, a wall thickness Tsb2 at an abutting location Ps2 of the longitudinal wall 25 where the bolt head 43 (the solid square) abuts when the bolt head 43 is rotated in a direction that tightens the nut 60 approaches the wall thickness Trb of the second abutting location Pr. However, if the bolt head 43 that is rotated in the direction that tightens the nut 60 abuts at the abutting location Ps2, the force acting on the enclosure wall 21 will be in the longitudinal direction of the case cover 13 (i.e., the Y axis direction in the drawing). Therefore, the longitudinal wall 25 will not easily crack or break even at the abutting location Ps2.

In the case of FIG. 4C, the wall thickness Tsb2 at the abutting location Ps2 of the longitudinal wall 25 is greater than the wall thickness Trb at the second abutting location Pr of the lateral wall 23. That is, it should be noted that a relationship between the abutting locations Ps2 and Pr, in which the wall thickness Tsb2 at the abutting location Ps2 of the longitudinal wall 25 where the bolt head 43 that has been rotated in the tightening direction of the nut 60 abuts is greater than the wall thickness Trb of the second abutting location Pr of the lateral wall 23 where the bolt head 43 that has been rotated in the loosening direction of the nut 60 abuts, is established. Therefore, the requirement of the inner peripheral shape to increase the strength of the enclosure wall when stopping rotation in the direction that tightens the nut may be realized in the following manner. That is, the inner peripheral shape of the enclosure wall 21 is determined such that the wall thickness at an abutting location closest to the edge in the short direction of the case cover 13 when the bolt head has been rotated in a direction that tightens the nut is thicker than the wall thickness at an abutting location closest to the edge in the short direction when the bolt head has been rotated in the direction that loosens the nut.

The examples shown in FIGS. 4B and 4C illustrate cases of extreme angles θ, i.e., the minimum angle θa and the maximum angle θb. Therefore, the angle θ described above is set to a suitable value based on results of individual specific tests and computer simulations, between zero degrees and up to but not including 45 degrees. As is understood from FIGS. 4B and 4C, when θ=0 and θ=45 (180/4), the wall thickness at the first abutting location and the wall thickness at the second abutting location are equal.

The shape of the case 11 of the battery 10 tends to shift in a flat thin box shape. In particular, in the battery pack 2 in which a plurality of the batteries 10 are arranged parallel to each other, there is a need for specifications in which the width in the short direction (the X axis direction) of the battery 10 is as small as possible. Therefore, there are cases in which there is a limitation placed on the length of the insulating plate 20 in the short direction (the X axis direction), so a structure such as that shown in FIG. 4C is difficult to employ. In cases where such a limitation exists, it is effective to use a structure such as that shown in FIG. 4A. In the structure shown in FIG. 4A, one side of the outer peripheral shape of the bolt head 43 is parallel to the longitudinal direction, when the bolt head 43 (the solid line) is rotated in the tightening direction of the nut 60 inside the enclosure wall 21 and this rotation is prevented by the lateral wall 23. At this time, the width of the bolt head 43 in the short direction of the case cover 13 is the shortest. By forming the enclosure wall in a shape that prevents rotation in this posture, the wall thickness Ts of the first abutting location Ps is able to be adequately thick, and an adequate wall thickness Tr of the second abutting location Pr is able to be left. In this way, determining the wall thickness at the first abutting location such that one side of the bolt head is parallel to the longitudinal direction of the case cover when the bolt head is rotated in the tightening direction of the nut and the bolt head abuts against the pair of lateral walls is one suitable example.

The longitudinal direction (the Y axis direction) of the insulating plate 20 is less restricted than the short direction (the X axis direction). Therefore, for example, the wall thickness of the longitudinal wall 25 is able to be set larger (thicker) than the wall thickness of the lateral wall 23. Accordingly, even if the positive electrode terminal bolt 40 or the negative electrode terminal bolt 50 rotates together with the nut 60 from the tightening torque when screwing down (i.e., fastening) the bus bar 7 and the like, the longitudinal wall 25 is unlikely to crack or break.

While it is possible to stop rotation with only the pair of longitudinal walls 25, doing so would result in twice the force being applied to each of the two longitudinal walls 25, compared to when rotation is stopped by both the pair of longitudinal walls 25 and the pair of lateral walls 23. The longitudinal walls 25 and the lateral walls 23 provided on the insulating plate 20 are often made of resin or ceramics. If the longitudinal walls 25 and the lateral walls 23 are made of ceramics, these walls may end up deforming and allowing the bolt head to rotate freely when excessive force is applied to the wall surfaces. If the longitudinal walls 25 and the lateral walls 23 are made of ceramics, they may crack if excessive force is applied to the wall surfaces. Therefore, it is preferable to stop the bolt head from rotating at as many locations as possible. Hence, it is effective to increase the strength of the first abutting location of the lateral wall provided on both sides of the bolt head in the short direction of the case cover.

Figure 5A:
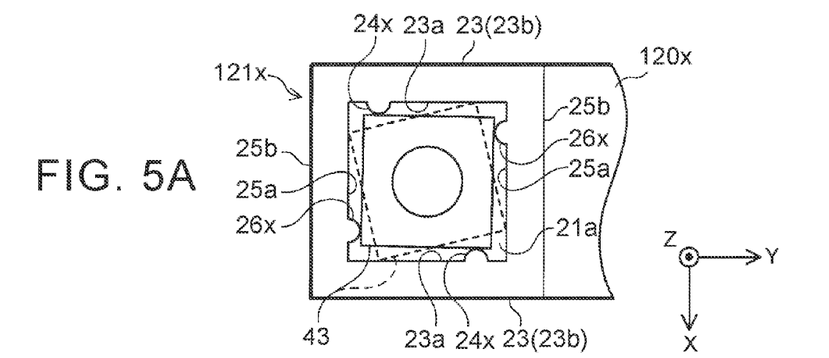
FIG. 5A is a plan view of a first modified example of the enclosure wall, among plan views of modified examples of the enclosure wall of the insulating plate.
Figure 5B:
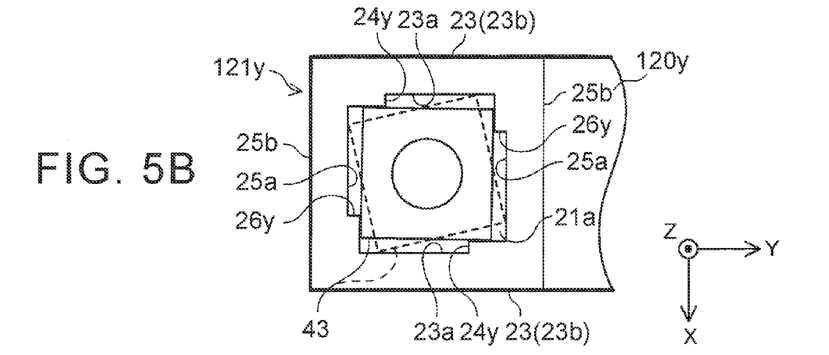
FIG. 5B is a plan view of a second modified example of the enclosure wall, among plan views of modified examples of the enclosure wall of the insulating plate.
Figure 5C:
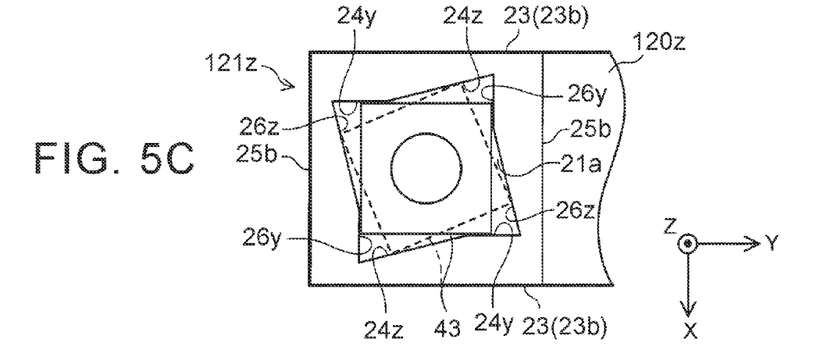
FIG. 5C is a plan view of a third modified example of the enclosure wall, among plan views of modified examples of the enclosure wall of the insulating plate.

The insulating plate 20 on the positive electrode side has been described above, but the insulating plate 30 on the negative electrode side is the same. Continuing on, a modified example of the insulating plate 20 on the positive electrode side will be described, but the following description may also be applied to the insulating plate 30 on the negative electrode side. FIGS. 5A to 5C are views of modified examples of the enclosure wall formed on the insulating plate 20.

In the structural example of the enclosure wall 21 described above, the outer peripheral shape of the bolt head 43 of the positive electrode terminal bolt 40 is a regular tetragon. Therefore, the inner peripheral shape of the enclosure wall 21 is formed in a similar regular tetragon shape that is larger than the regular tetragon of the bolt head 43. The inner peripheral shape is also formed in a posture that has been rotated in the loosening direction of the nut 60 such that the inner wall surface 23a of the lateral wall 23 is at an angle θ (0 degrees<θ<45 degrees) with respect to the longitudinal direction of the case cover (the outer wall surface 23b of the lateral wall 23).

In contrast, an enclosure wall 121x of an insulating plate 120x shown in FIG. 5A forms the shape below, instead of rotating a regular tetragon of the inner peripheral shape of the enclosure wall. The insulating plate 120x in FIG. 5A includes a protruding portion 24x on each inner wall surface 23a of the pair of lateral wall 23, such that the bolt head 43 that has been rotated in the tightening direction shown in FIG. 4A to FIG. 4C abuts at a location corresponding to the first abutting location Ps. This protruding portion 24x is formed at a location (the first abutting location Ps shown in FIG. 4A) where the bolt head 43 (the solid square) abuts when the bolt head 43 has been rotated in the direction that tightens the nut 60. Also, a protruding portion 26x is also formed in the same position as the protruding portion 24x on each inner wall surface 25a of the longitudinal walls 25. The protruding portions 24x and 26x may be integrally formed with the insulating plate 120x, or formed separately. With this kind of structure as well, the wall thickness at the location (the first abutting location) where the bolt head 43 (the solid square) that has been rotated in the tightening direction abuts is larger (thicker) than the wall thickness at the location (the second abutting portion) where the bolt head 43 (the broken square) that has been rotated in the loosening direction abuts. Therefore, even if the positive electrode terminal bolt 40 rotates together with the nut 60, the lateral wall 23 will not easily crack or break. Meanwhile, the bolt head is allowed to rotate within a predetermined angular range by making the thickness at the second abutting location thin.

These kinds of protruding portions 24x and 26x may also be changed to step portions 24y and 26y of an enclosure wall 121y as shown in FIG. 5B, for example. The step portion 24y is formed at the location (the first abutting location Ps shown in FIG. 4A) where the bolt head 43 (the solid square) abuts when the bolt head 43 is rotated in the direction that tightens the nut 60. Also, the step portion 26y is also formed in the same position as the step portion 24y on each inner wall surface 25a of the longitudinal walls 25. The step portions 24y and 26y may be integrally formed with the insulating plate 120y, or formed separately. With this kind of structure as well, the wall thickness at the location (the first abutting location) where the bolt head 43 (the solid square) that has been rotated in the tightening direction abuts is larger (thicker) than the wall thickness at the location (the second abutting portion) where the bolt head 43 (the broken square) that has been rotated in the loosening direction abuts. Therefore, even if the positive electrode terminal bolt 40 rotates together with the nut 60, the lateral wall 23 will not easily crack or break.

Also, recessed portions 24z and 26z may be formed in locations (the second abutting location Pr shown in FIG. 4A) where the bolt head 43 (the broken square) abuts when the bolt head 43 is rotated in the direction that loosens the nut 60, while keeping the step portions 24y and 26y, as is the case with an enclosure wall 121z of an insulating plate 120z shown in FIG. 5C. That is, the structure may be such that the wall thickness of the lateral wall 23 and the longitudinal wall 25 at the position of the second abutting location Pr may be made smaller (thinner) by the amount that the wall thickness of the lateral wall 23 and the longitudinal wall 25 in the position where the step portions 24y and 26y are formed is made larger (thicker). With this kind of structure as well, the wall thickness at the location (the first abutting location) of the lateral wall 23 where the bolt head 43 (the solid square) that has been rotated in the tightening direction abuts is larger (thicker) than the wall thickness at the location (the second abutting location) of the lateral wall 23 where the bolt head 43 (the broken square) that has been rotated in the loosening direction abuts. Therefore, even if the positive electrode terminal bolt 40 rotates together with the nut 60, the lateral wall 23 will not easily crack or break.

The examples shown in FIGS. 5A to 5C describe the insulating plate on the positive electrode side, but the same may also be applied to the insulating plate on the negative electrode side. In the description above, the outer shapes of the bolt heads 43 and 53 of the positive electrode terminal bolt 40 and the negative electrode terminal bolt 50 are illustrated as being regular tetragons, but as long as the outer shapes are regular polygons with an even number of apexes, the structure of the insulating plate 20 described above is able to be applied, even if the outer shapes of the bolt heads 43 and 53 are regular hexagons or regular octagons.

That is, when the inner peripheral shape of an enclosure wall 221 (a lateral wall 223 and a longitudinal wall 225) is a shape similar to a regular hexagon of a bolt head 243, as is the case with an insulating plate 220 shown in FIG. 6A to FIG. 6C, the inner peripheral shape of the lateral wall 223 and the longitudinal wall 225 are formed as described below. The inner peripheral shape is formed with a posture in which one side, of the sides that form the inner peripheral shape, is rotated at an angle greater than zero degrees and less than 30 degrees (=180 degrees/6), in the direction that loosens the nut 60, with respect to a posture in which the one side is parallel to the longitudinal direction (the Y axis direction) of the case cover 13.

Figure 6A:
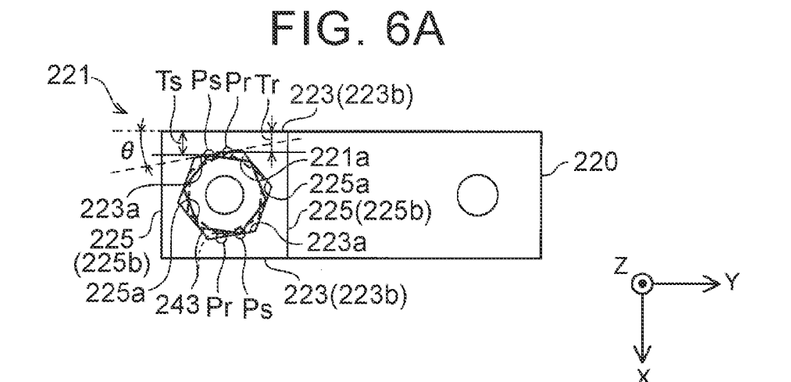
FIG. 6A is a plan view illustrating the positional relationship between an inner peripheral shape of an enclosure wall when the inner peripheral shape of the enclosure wall is a hexagon, with the posture (angle θ) of the inner peripheral shape.

FIG. 6A is a view corresponding to FIG. 4A of a case in which the inner peripheral shape of the enclosure wall 221 is a regular tetragon. That is, in FIG. 6A, the bolt head 243 represented by a solid regular hexagonal shape is shown rotated in the tightening direction of the nut 60 inside the enclosure wall 221, and this rotation is prevented by the lateral wall 223. In contrast, the bolt head 243 represented by a broken regular hexagonal shape is shown rotated in the loosening direction of the nut 60, and this rotation is prevented by the lateral wall 223. The wall thickness Ts at a location (the first abutting location Ps) of the lateral wall 223 where the bolt head 243 that has been rotated in the tightening direction abuts is greater (thicker) than the wall thickness Tr at a location (the second abutting location Pr) of the lateral wall 223 where the bolt head 243 that has been rotated in the loosening direction abuts.

Figure 6B:
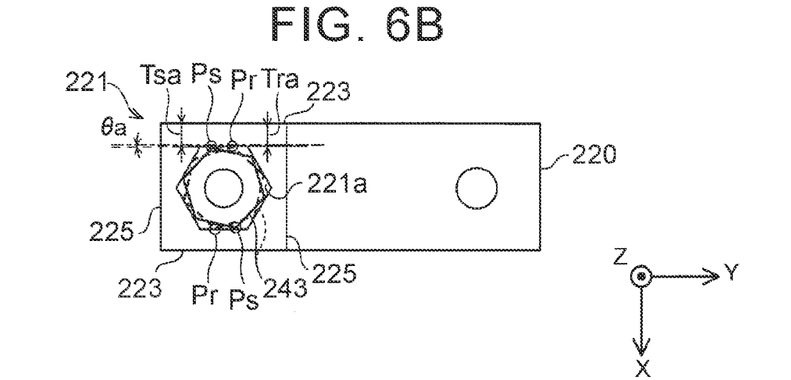
FIG. 6B is a plan views illustrating the positional relationship between an inner peripheral shape of an enclosure wall when the inner peripheral shape of the enclosure wall is a hexagon, with the posture (angle θa) of the inner peripheral shape being different from the posture of the inner peripheral shape in FIG. 6A.
Figure 6C:
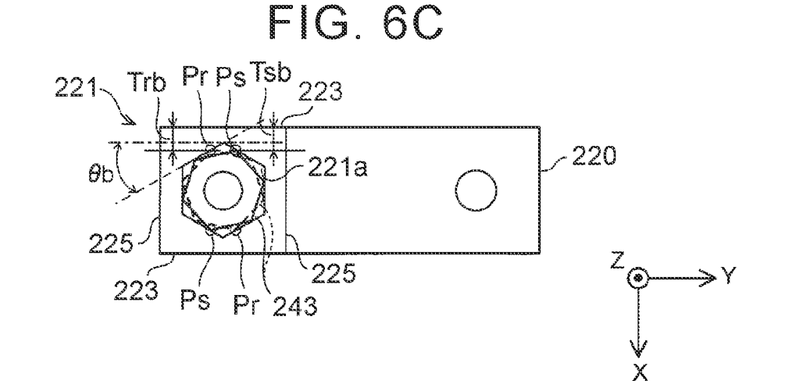
FIG. 6C is a plan view illustrating the positional relationship between an inner peripheral shape of an enclosure wall when the inner peripheral shape of the enclosure wall is a hexagon, with the posture (angle θb) of the inner peripheral shape being different from the postures of the inner peripheral shape in FIG. 6A and FIG. 6B.

Also, as shown in FIG. 6B, with a minimum angle θa that slightly exceeds 0 (zero) degrees, for example, the wall thickness Tsa at the location (the first abutting location Ps) of the lateral wall 223 where the bolt head 43 (the solid hexagon) abuts when the bolt head 243 is rotated in the direction that tightens the nut 60 is slightly greater (thicker) than a wall thickness Tra at a location (the second abutting location Pr) of the lateral wall 223 where the bolt head 43 (the broken hexagon) abuts when the bolt head 243 is rotated in the direction that loosens the nut 60. Further, as shown in FIG. 6C, with a maximum angle θb that is slightly under 30 degrees, for example, the wall thickness Tsb at a location (the first abutting location Ps) of the lateral wall 223 where the bolt head 243 (the solid regular hexagon) abuts when rotated in the direction that tightens the nut 60 is slightly larger (thicker) than a wall thickness Trb at a location (the second abutting location Pr) of the lateral wall 223 where the bolt head 243 (the broken regular hexagon) abuts when rotated in the direction that loosens the nut 60.

Therefore, even if the inner peripheral shape of the enclosure wall is a regular hexagon, the lateral wall 223 will not easily crack or break even if the positive electrode terminal bolt 40 or the negative electrode terminal bolt 50 rotates together with the nut 60, just as when the inner peripheral shape of the enclosure wall is the regular tetragon described above. Although not shown, with a case in which the inner peripheral shape of the enclosure wall is a regular octagon, the wall thickness at a location (a first abutting location) of the lateral wall where the bolt head abuts when the bolt head is rotated in the direction that tightens the nut 60 is able to be made greater (thicker) than the wall thickness at a location (a second abutting location) of the lateral wall where the bolt head abuts when the bolt head is rotated in the direction that loosens the nut 60, similar to when the inner peripheral shape of the enclosure wall is a regular hexagon. Therefore, even if the positive electrode terminal bolt 40 or the negative electrode terminal bolt 50 rotates together with the nut 60, the lateral wall 223 will not easily crack or break.

Accordingly, when the inner peripheral shape of a rotation stopping wall that surrounds an enclosure wall formed on an insulating plate has a shape similar to a regular N-cornered shape having an even number N of apexes of a bolt head, the inner peripheral shape of the enclosure wall is formed with a posture such as that described below. The inner peripheral shape is formed with posture in which one side of the regular N-cornered shape is rotated an angle greater than zero degrees and less than (180/N) degrees in the direction that loosens the nut, with respect to a posture in which the one side is parallel to the longitudinal direction of the case cover 13. With an enclosure wall having an inner peripheral shape that meets this kind of condition, the wall thickness at an abutting location (a first abutting location) in the nut tightening direction is greater than a wall thickness at an abutting location (a second abutting location) in the direction that loosens the nut, compared to when an inner wall surfaces of the pair of lateral walls are formed parallel to the longitudinal direction of the case cover. Even if the bolt rotates together with the nut from the tightening torque when the nut is screwed onto the bolt, the lateral walls will not easily crack or break.

As described above, with the battery 10 that forms the battery pack 2 of the example embodiment, when the bolt head 43 of the positive electrode terminal bolt 40 has a regular N-cornered shape having an even number N of apexes, the wall thickness Tr at the location (the second abutting location) of the lateral wall 23 that stops the bolt head 43 from rotating when the bolt head 43 is rotated in the direction that loosens the nut 60 is made thinner, and the wall thickness Ts at the location (the first abutting location) of the lateral wall 23 that stops the bolt head 43 from rotating when the bolt head 43 is rotated in the direction that tightens the nut 60 is made thicker by that amount. With the enclosure wall on the side with the negative electrode terminal bolt 50 as well, the enclosure wall is formed such that the same conditions are satisfied.

In the example embodiment described above, a case is illustrated and described in which the screw tightening direction of the nut 60, the positive electrode terminal bolt 40, and the negative electrode terminal bolt 50 is the clockwise direction. However, with a combination of a nut 60, a positive electrode terminal bolt 40, and a negative electrode terminal bolt 50 in which the screw tightening direction is the counterclockwise direction, the positional relationship becomes such that the inner peripheral shapes of the enclosure walls 21, 121, and 221 shown in FIGS. 4 to 6 are flipped horizontally in the Y axis direction with an axis of symmetry that passes through the center of the drawing of the enclosure walls 21, 121, and 221 in the X axis direction as the boundary.

For example, in the examples in FIGS. 4A and 5, the enclosure wall 21 is formed by the pair of lateral walls 23 and the pair of longitudinal walls 25. Also, in each of the pair of lateral walls 23, the wall thickness at the first abutting location where the bolt head abuts when the bolt head is rotated in the tightening direction of the nut that screws onto the terminal bolt is greater than the wall thickness at the second abutting location where the bolt head abuts when the bolt head is rotated in the loosening direction of the nut. The pair of longitudinal walls 25 has the same structure as the pair of lateral walls 23. That is, in each of the pair of longitudinal walls 25, the wall thickness at the first abutting location where the bolt head abuts when the bolt head is rotated in the tightening direction of the nut that screws onto the terminal bolt is greater than the wall thickness at the second abutting location where the bolt head abuts when the bolt head is rotated in the loosening direction of the nut. The characteristics of the battery in the examples shown in FIGS. 4A and 5 may be described as follows. A pair of first rotation stopping walls (the lateral walls 23) that stop rotation of the bolt head are provided, one on each side of the bolt head in the short direction of the case cover, on the insulating plate. A pair of second rotation stopping walls (the longitudinal walls 25) that stop rotation of the bolt head are provided, one on each side of the bolt head in the longitudinal direction of the case cover, on the insulating plate. In each of the pair of first rotation stopping walls, the wall thickness at a first abutting location where the bolt head abuts when the bolt head is rotated in the tightening direction of the nut that screws onto the terminal bolt is greater than the wall thickness at a second abutting location where the bolt head abuts when the bolt head is rotated in the loosening direction of the nut. In each of the pair of second rotation stopping walls as well, the wall thickness at a first abutting location where the bolt head abuts when the bolt head is rotated in the tightening direction of the nut that screws onto the terminal bolt is greater than the wall thickness at a second abutting location where the bolt head abuts when the bolt head is rotated in the loosening direction of the nut.

Points to keep in mind regarding the technology described in the example embodiment will now be described. The electrode body 70 corresponds to one example of a power generating element. The case cover 13 corresponds to one example of a top plate of a case of a battery. The insulating plate 20, 30, and 120 corresponds to one example of an insulating plate. The connecting plates 18 and 19 each corresponds to one example of a connecting terminal plate. The lateral walls 23, 123, and 223 correspond to one example of a pair of rotation stopping walls provided one on each side of a bolt head in a short direction of a case cover. The positive electrode terminal bolt 40 and the negative electrode terminal bolt 50 each corresponds to one example of a terminal bolt.

In the example embodiment, the "wall thickness at a first abutting location" and the "wall thickness at a second abutting location" refer to the thickness of the lateral walls (the rotation stopping walls) at locations (a first abutting location and a second abutting location) where the bolt head abuts against the lateral walls (the rotation stopping walls). In other words, the "wall thickness at a first abutting location" and the "wall thickness at a second abutting location" refer to the shortest distance from the abutting location on the bolt head to an edge in the short direction of the insulating plate.

In the battery pack 2 of the example embodiment, the spacer 5 has a plurality of grooves extending in the height direction of the battery 10. The grooves provided in the spacer are not limited to extending linearly in the height direction as long as a cooling medium is able to flow through them. The grooves may extend in any direction. Also, the grooves may be curved.

Heretofore, specific examples of the invention have been described in detail, but these are merely examples. The invention is not limited to these examples. The technologies according to the invention also include various modifications of the specific examples described above. Also, the technical elements illustrated in the specification and the drawings display technical utility both alone and in various combinations. Further, the technology illustrated in the specification and the drawings simultaneously achieves a plurality of objects, and has technical utility by simply achieving one of these objects.

What is claimed is:

1. A battery comprising:
a flat case that has a top plate being an elongated rectangular shape;
a power generating element that is housed in the case;
an insulating plate arranged above the top plate;
a terminal bolt that is arranged above the insulating plate such that a top surface of a bolt head faces the insulating plate; and
a connecting terminal plate that is electrically connected to the power generating element and insulated from the top plate, plate, and that fits loosely over the terminal bolt with the bolt head sandwiched between the connecting terminal plate and the insulating plate, wherein
the bolt head has a regular N-sided polygon shape having an even number of apexes;
the insulating plate includes a pair of rotation stopping walls, including a first rotation stopping wall and a second rotation stopping wall, that stop rotation of the bolt head with respect to the insulating plate and that are respectively provided on each side of the bolt head in a short direction of the top plate,
a wall thickness of the first rotation stopping wall at a first abutting location, where the bolt head abuts the first rotation stopping wall when the bolt head is rotated in a tightening direction of a nut that screws onto the terminal bolt and the bolt head is stopped from further rotating by the first rotation stopping wall, is greater than a wall thickness of the first rotation stopping wall at a second abutting location, where the bolt head abuts the first rotation stopping wall when the bolt head is rotated in a loosening direction of the nut and the bolt head is stopped from further rotating by the first rotation stopping wall, and
a wall thickness of the second rotation stopping wall at a third abutting location, where the bolt head abuts the second rotation stopping wall when the bolt head is rotated in a tightening direction of the nut that screws onto the terminal bolt and the bolt head is stopped from further rotating by the second rotation stopping wall, is greater than a wall thickness of the second rotation stopping wall at a fourth abutting location, where the bolt head abuts the second rotation stopping wall when the bolt head is rotated in a loosening direction of the nut and the bolt head is stopped from further rotating by the second rotation stopping wall.

2. The battery according to claim 1, wherein
the bolt head is surrounded by an enclosure wall that includes the pair of rotation stopping walls;
an inner peripheral shape of the enclosure wall when viewed from an axial direction of the terminal bolt is a shape similar to an outer peripheral shape of the bolt head having the regular N-sided polygon shape, and
the inner peripheral shape is formed with a posture in which one side of the regular N-sided polygon of the inner peripheral shape is rotated at an angle of greater than zero degrees and less than 180/N degrees, in the loosening direction of the nut, with respect to a posture in which the one side is parallel to a longitudinal direction of the top plate.

3. The battery according to claim 1, wherein
the wall thickness at the first abutting location is set such that one side of the bolt head is parallel to a longitudinal direction of the top plate when the bolt head is rotated in the tightening direction of the nut and the bolt head is abutted against the rotation stopping walls.

4. The battery according to claim 1, wherein
the first abutting location is a protruding portion provided on the first rotation stopping wall of the pair of stopping walls such that the protruding portion extends inwards from an inner surface of the first rotation stopping wall.

5. The battery according to claim 1, wherein
one stopping wall of the pair of stopping walls includes a first wall surface that has a first abutting portion, and a second wall surface that has a second abutting portion.

6. A battery pack in which a plurality of the batteries according to claim 1 are arranged parallel to each other, wherein
the terminal bolts of the batteries that are adjacent to one another are connected by a bus bar; and
the bus bar is fastened to the bolts by the nuts.

7. The battery according to claim 1, wherein the bolt head has a four-sided polygon shape.

* * * * *